(12) United States Patent
Lo et al.

(10) Patent No.: US 9,639,259 B2
(45) Date of Patent: May 2, 2017

(54) PORTABLE ELECTRONIC DEVICE AND METHOD FOR CONTROLLING DISPLAYED INFORMATION THEREOF

(71) Applicant: Chiun Mai Communication Systems, Inc., New Taipei (TW)

(72) Inventors: Wei-Hsien Lo, New Taipei (TW); Che-Ping Chang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 210 days.

(21) Appl. No.: 14/478,227

(22) Filed: Sep. 5, 2014

(65) Prior Publication Data

US 2015/0074593 A1    Mar. 12, 2015

(30) Foreign Application Priority Data

Sep. 11, 2013  (CN) .......................... 2013 1 0411459 6

(51) Int. Cl.
*G06F 3/048* (2013.01)
*G06F 3/0485* (2013.01)
*G06F 1/16* (2006.01)
*G06F 3/00* (2006.01)
*H04M 1/725* (2006.01)

(52) U.S. Cl.
CPC ............ *G06F 3/0485* (2013.01); *G06F 1/169* (2013.01); *H04M 1/72519* (2013.01); *H04M 2250/12* (2013.01)

(58) Field of Classification Search
CPC .......................... G06F 3/0485; G06F 17/30902
See application file for complete search history.

(56) References Cited

U.S. PATENT DOCUMENTS

| | | | | |
|---|---|---|---|---|
| 7,358,963 | B2 * | 4/2008 | Low ...................... | G06F 3/0317 345/163 |
| 2010/0149113 | A1 * | 6/2010 | Hansson ............... | G06F 1/3231 345/173 |
| 2011/0310005 | A1 * | 12/2011 | Chen ...................... | G06F 1/3203 345/156 |
| 2013/0120257 | A1 * | 5/2013 | Park ........................ | G06F 3/041 345/158 |
| 2013/0181896 | A1 * | 7/2013 | Gruhlke .................. | G06F 3/017 345/156 |
| 2014/0129975 | A1 * | 5/2014 | Ramachandran ..... | G06F 3/0488 715/784 |
| 2014/0292396 | A1 * | 10/2014 | Bruwer ................ | H03K 17/955 327/517 |

* cited by examiner

*Primary Examiner* — Nicholas Augustine
(74) *Attorney, Agent, or Firm* — Steven Reiss

(57) ABSTRACT

A portable electronic device includes a display unit, a sensing unit, and a signal processing unit. The sensing unit includes a proximity sensor. The proximity sensor detects a distance between an object and the portable electronic device. The signal processing unit is electronically connected to the display unit and the proximity sensor. The signal processing unit switches a scrolling mode of an image displayed on the display unit according to a detection of the proximity sensor.

10 Claims, 4 Drawing Sheets

PORTABLE ELECTRONIC DEVICE AND METHOD FOR CONTROLLING DISPLAYED INFORMATION THEREOF

CROSS-REFERENCE TO RELATED APPLICATIONS

This application claims priority to Chinese Patent Application No. 201310411459.6 filed on Sep. 11, 2013, the contents of which are incorporated by reference herein.

FIELD

The disclosure generally relates to a portable electronic device and a method for controlling displayed information of the portable electronic device.

BACKGROUND

Portable electronic device, such as a mobile phone or a personal digital assistant (PDA), are widely used. For example, users can read documents or browse web information through the mobile phone. When the portable electronic device is used, the user needs to scroll the web or the document with a finger sliding the display screen of the portable electronic device.

BRIEF DESCRIPTION OF THE DRAWINGS

Implementations of the present technology will now be described, by way of example only, with reference to the attached figures.

DETAILED DESCRIPTION

Figure 1:
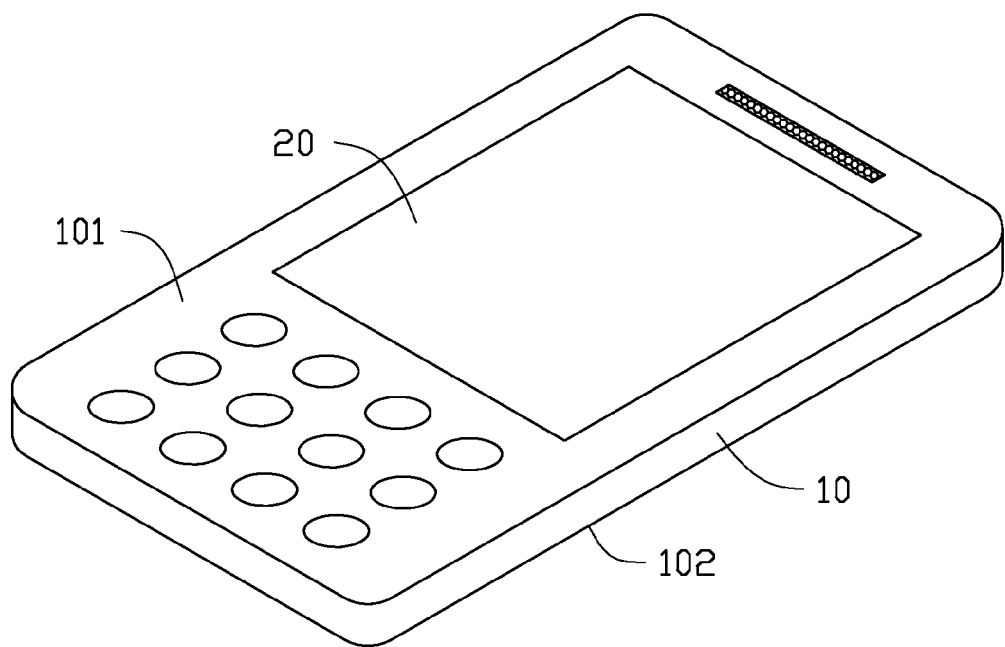
FIG. 1 is a block diagram of an embodiment of a portable electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "comprising" when utilized, means "including, but not necessarily limited to"; it specifically indicates open-ended inclusion or membership in the so-described combination, group, series and the like.

FIG. 1 illustrates an embodiment of a portable electronic device 100. The portable electronic device 100 may be a mobile phone, a personal digital assistant (PDA), or a handheld computer. The portable electronic device 100 includes a display unit 20, a sensing unit 30, and a signal processing unit 50.

The display unit 20 may be a liquid crystal display device, a light-emitting diode (LED) display device, or an organic LED display device. The display unit 20 is electronically connected to the signal processing unit 50 and is configured to display a portion of an image, for example, a web image or a document image. In this embodiment, the image displayed on the display unit 20 has a first scrolling mode and a second scrolling mode. The first scrolling mode is an automatic mode which represents that the image displayed on the display unit 20 can be moved, for example, automatically scrolled along a predetermined direction under a control of the signal processing unit 50. The second scrolling mode is a manual mode which represents that the image displayed on the display unit 20 is scrolled by a manual operation, for example, the image displayed on the display unit 20 is scrolled by the user directly sliding the display unit 20 or operating a function button on the portable electronic device 100.

The sensing unit 30 includes a proximity sensor 31 and a light sensor 33. The proximity sensor 31 is electronically connected to the signal processing unit 50. The proximity sensor 31 is configured to detect whether a distance between an outside object (for example, a finger of a user) and the portable electronic device 100 is in a predetermined range and send a corresponding sensing signal to the signal processing unit 50 according to the detection. Generally, the proximity sensor 31 has a maximum sensing distance that the proximity sensor 31 can sense, for example, 3 mm. In this embodiment, the predetermined range is from about 0 mm to the maximum sensing distance of the proximity sensor 31. Thus, when a distance between the object (for example, a finger of the user) and the portable electronic device 100 is in the predetermined range, the proximity sensor 31 outputs a first sensing signal (for example, a high level signal, logic 1) to the signal processing unit 50. When the distance between the object and the portable electronic device 100 is out of the predetermined range, for example, the distance between the object and the portable electronic device 100 is about 4 mm, the proximity sensor 31 outputs a second sensing signal different from the first sensing signal (for example, a low level signal, logic 0) to the signal processing unit 50.

The light sensor 33 is positioned adjacent to the proximity sensor 31 and is electronically connected to signal processing unit 50. Generally, when the object is only positioned above the sensing unit 30 and does not move, the light intensity around the portable electronic device 100 will not be changed. When the object is positioned above the sensing unit 30 and moves left or right, the light intensity around the portable electronic device 100 will be changed. Thus, the light sensor 33 is configured to detect whether a light intensity around the portable electronic device 100 is changed when the distance between the object and the portable electronic device 100 is in the predetermined range. When the light intensity around the portable electronic device 100 is changed, the light sensor 33 further converts the light intensity into an electronic signal and sends the electronic signal to the signal processing unit 50. For example, when the distance between the object and the portable electronic device 100 is in the predetermined range and the light sensor 33 detects that the light intensity around the portable electronic device 100 is not changed, the light sensor 33 outputs a first electronic signal (for example, a high level signal, logic 1) to the signal processing unit 50. When the distance between the object and the portable electronic device 100 is out of the predetermined range and the light sensor 33 detects that the light intensity around the portable electronic device 100 is changed, the light sensor 33 outputs a second electronic signal different from the first electronic signal (for example, a low level signal, logic 0) to the signal processing unit 50.

The signal processing unit 50 may be a central processing unit (CPU) of the portable electronic device 100. The signal processing unit 50 receives and processes the sensing signals from the proximity sensor 31 and switches a scrolling mode of the image displayed on the display unit 20 according to the received sensing signals. In this embodiment, when the signal processing unit 50 receives the first sensing signal from the proximity unit 31, the signal processing unit 50 determines that the distance between the object and the portable electronic device 100 is in the predetermined range and thus switches the image displayed on the display unit 20 to the first scrolling mode, that is, the image displayed on the display unit 20 is automatically scrolled along the predetermined direction under the control of the signal processing unit 50. Then, the signal processing unit 50 determines whether to switch the scrolling direction of the image displayed on the display unit 20 according to the detection of the light sensor 33. In detail, when the signal processing unit 50 receives the first electronic signal from the light sensor 33 which represents that a light intensity around the sensing unit 30 is not changed, the signal processing unit 50 keeps the image displayed on the display unit 20 to scroll along the predetermined direction, for example, scroll down. When the signal processing unit 50 receives the second electronic signal from the light sensor 33 which represents that the light intensity around the sensing unit 30 is changed, the signal processing unit 50 switches the image displayed on the display unit 20 to scroll along a direction opposite to the predetermined direction, for example, scroll up.

In addition, when the signal processing unit 50 receives the second sensing signal from the proximity unit 31, the signal processing unit 50 determines that the distance between the object and the portable electronic device 100 is out of the predetermined range and thus switches the image displayed on the display unit 20 to the second scrolling mode, that is, the image displayed on the display unit 20 is scrolled by a manual operation.

Figure 2:
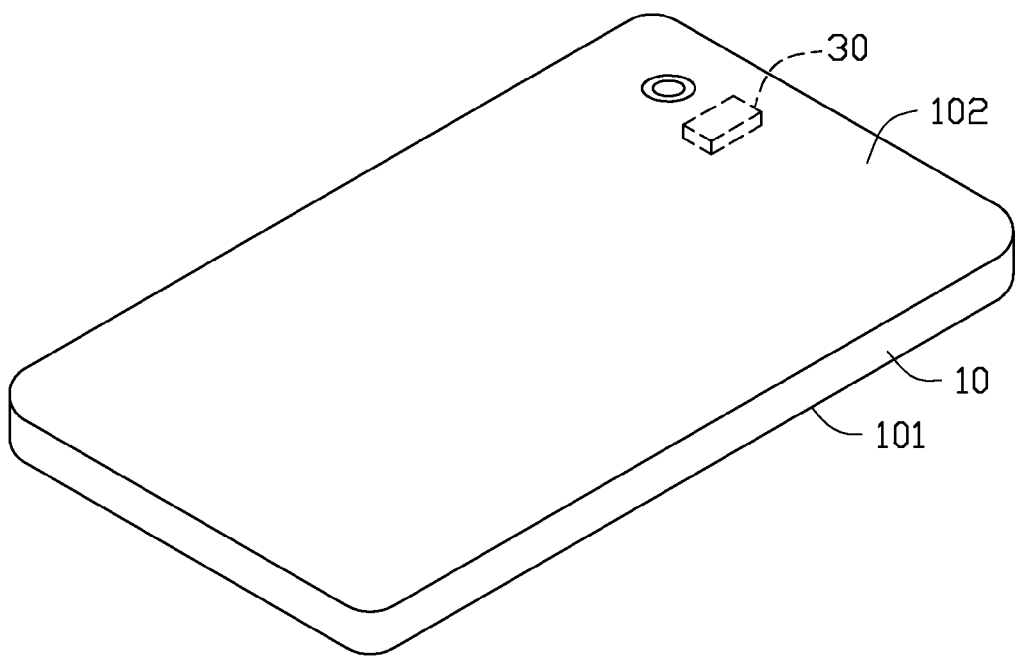
FIG. 2 is an isometric view of the portable electronic device of FIG. 1.

FIG. 2 shows the portable electronic device 100 further includes a main body 10. The main body 10 includes a first surface 101 and a second surface 102 opposite to the first surface 101. The display unit 20 is positioned in the middle of the first surface 101.

Figure 3:
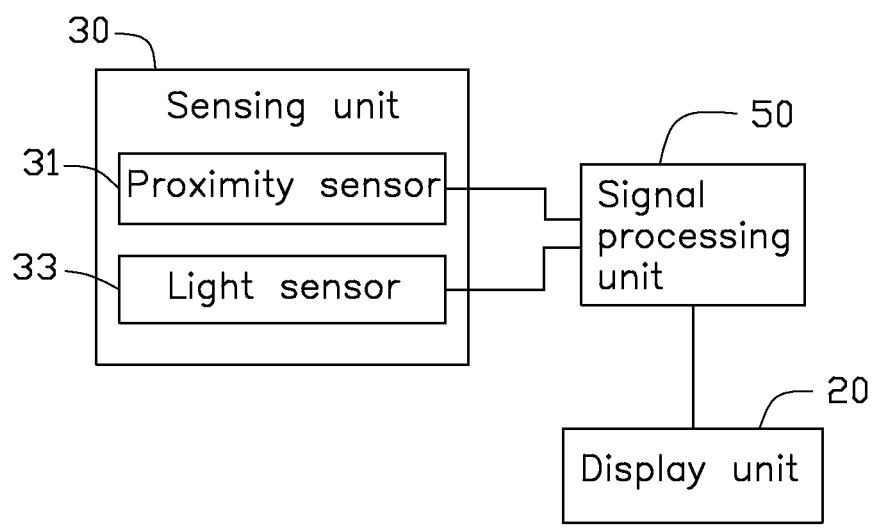
FIG. 3 is similar to FIG. 2, but shown in another angle.

FIG. 3 shows the sensing unit 30 is secured in the second surface 102. It can be understood that, the sensing unit 30 can be also positioned in any other region of the portable electronic device 100 where the sensing unit 30 can be touched.

Figure 4:
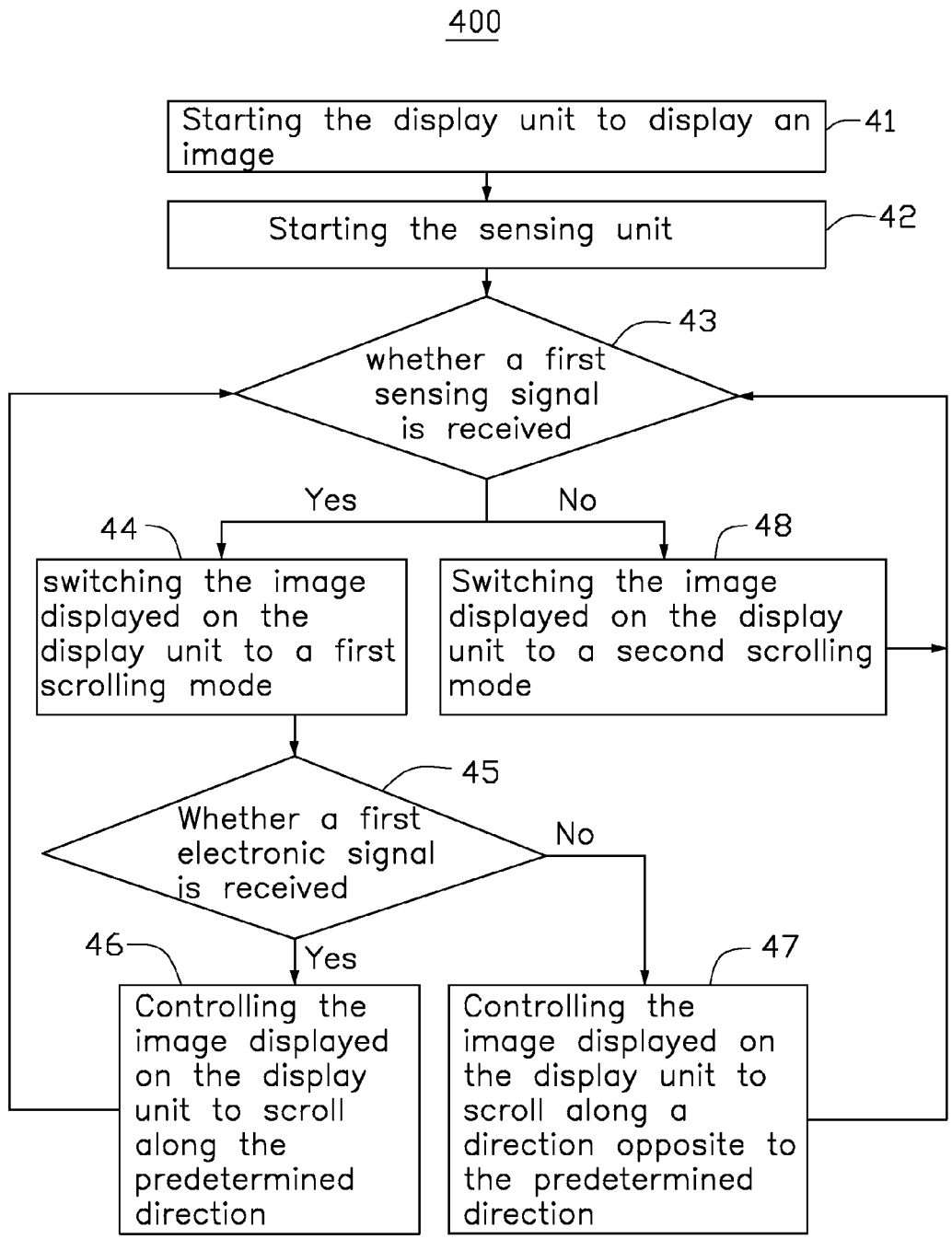
FIG. 4 is a flowchart of an embodiment of a method for controlling displayed information of the portable electronic device of FIG. 1.

Referring to FIG. 4, a flowchart is presented in accordance with an example embodiment which is being thus illustrated. The example method 400 is provided by way of example, as there are a variety of ways to carry out the method. The method 400 described below can be carried out using the configurations illustrated in FIGS. 1-3, for example, and various elements of these figures are referenced in explaining example method 400. Each block shown in FIG. 4 represents one or more processes, methods or subroutines, carried out in the exemplary method 400. Additionally, the illustrated order of blocks is by example only and the order of the blocks can change according to the present disclosure. The exemplary method 400 can begin at block 41.

At block 41, a portable electronic device 100 is provided. The portable electronic device 100 includes a display unit 20, a sensing unit 30, and a signal processing unit 50 electronically connected to the display unit 20 and the sensing unit 30. The display unit 20 is started to display image, such as a web image or a document image.

At block 42, the signal processing unit 50 starts the sensing unit 30, for example, the signal processing unit 50 outputs a driving signal to start the sensing unit 30.

At block 43, the signal processing unit 50 determines whether a first sensing signal is received.

At block 44, when the signal processing unit 50 receives the first sensing signal, the signal processing unit 50 determines that a distance between an object (for example, a finger of the user) and the portable electronic device 100 is in a predetermined range and switches the image displayed on the display unit 20 to a first scrolling mode, that is, the image displayed on the display unit 20 is moved, for example, automatically scrolled along a predetermined direction under a control of the signal processing unit 50. Generally, the proximity sensor 31 has a maximum sensing distance that the proximity sensor 31 can sense, for example, 3 mm. In this embodiment, the predetermined range is from about 0 mm to the maximum sensing distance of the proximity sensor 31.

At block 45, the signal processing unit 50 determines whether a first electronic signal is received.

At block 46, when the signal processing unit 50 receives the first electronic signal, the signal processing unit 50 determines that the distance between the object and the portable electronic device 100 is in the predetermined range and a light intensity around the sensing unit 30 is not changed. Thus, the signal processing unit 50 keeps the image displayed on the display unit 20 to scroll along the predetermined direction (for example, scroll down) and goes back block 43.

At block 47, when the signal processing unit 50 receives the second electronic signal, the signal processing unit 50 determines that the distance between the object and the portable electronic device 100 is in the predetermined range and the light intensity around the sensing unit 30 is changed. Thus, the signal processing unit 50 controls the image displayed on the display unit 20 to scroll along a direction opposite to the predetermined direction (for example, scroll up) and goes back block 43.

At block 48, due to the signal processing unit 50 receives a second sensing signal opposite to the first sensing signal, the signal processing unit 50 determines that the distance between the user and the portable electronic device 100 is out of the predetermined range and switches the image displayed on the display unit 20 to a second scrolling mode, that is, the image displayed on the display unit 20 is scrolled by a manual operation, and goes back block 43.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A portable electronic device, comprising:
a display unit configured to display a portion of an image;
a sensing unit comprising a proximity sensor, the proximity sensor detecting a distance between an object and the portable electronic device; and
a signal processing unit electronically connected to the display unit and the proximity sensor;
wherein when the proximity sensor senses that the distance between the object and the portable electronic device is in a predetermined range, the signal processing unit switches the image displayed on the display unit to a first scrolling mode; when the proximity sensor senses that the distance between the object and the portable electronic device is out of the predetermined range, the signal processing unit switches the image displayed on the display unit to a second scrolling mode; and the second scrolling mode represents that the image displayed on the display unit is scrolled by a manual operation.

2. The portable electronic device of claim 1, wherein the first scrolling mode represents that the image displayed on the display unit is automatically scrolled along a predetermined direction under a control of the signal processing unit.

3. The portable electronic device of claim 1, wherein the predetermined range is from about 0 mm to a maximum sensing distance of the proximity sensor that the proximity sensor can sense.

4. The portable electronic device of claim 2, wherein the sensing unit further comprises a light sensor, the light sensor is electronically connected to the signal processing unit and is configured to detect whether a light intensity around the portable electronic device is changed when the distance between the object and the portable electronic device is in the predetermined range, the signal processing unit determines whether to switch a scrolling direction of the image displayed on the display unit according the light intensity.

5. The portable electronic device of claim 4, wherein when the distance between the object and the portable electronic device is in the predetermined range and the light intensity around the portable electronic device is not changed, the signal processing unit keeps the image displayed on the display unit to scroll along the predetermined direction; when the distance between the object and the portable electronic device is in the predetermined range and the light intensity around the portable electronic device is changed, the signal processing unit controls displayed information on the display unit to scroll along a direction opposite to the predetermined direction.

6. The portable electronic device of claim 1, further comprising a main body, wherein the main body comprises a first surface and a second surface opposite to the first surface, the display unit is positioned in the middle of the first surface and the sensing unit is secured in the second surface.

7. A method for controlling a scrolling mode of a displayed image of a portable electronic device, the method comprising:
sensing a distance between an object and the portable electronic device; and
switching the displayed image to a first scrolling mode when the distance between the object and the portable electronic device being in a predetermined range; and
switching the displayed image to a second scrolling mode when the distance between the object and the portable electronic device being out of the predetermined range, and the second scrolling mode representing that the displayed image is scrolled by a manual operation.

8. The method of claim 7, further comprising:
sensing whether a light intensity around the portable electronic device is changed when the distance between the object and the portable electronic device is in the predetermined range; and
determining whether to switch a scrolling direction of the displayed image according to the light intensity.

9. The method of claim 8, further comprising:
keeping the displayed image to scroll along a predetermined direction when the light intensity is not changed; and
controlling the displayed image to scroll along a direction opposite to the predetermined direction when the light intensity is changed.

10. A portable electronic device comprising:
a display unit configured to display a portion of an image;
a signal processing unit electronically connected to the display unit; and
a sensing unit electrically connected to the signal processing unit;
wherein the portion of the image displayed on the display is determined by output from the signal processing unit and may be moved by the signal processing unit; the sensing unit comprises a proximity sensor, the proximity sensor detects a distance of the portable electronic device from an outside object; when the proximity sensor senses that the distance of the portable electronic device from the outside object is in a predetermined range, the signal processing unit switches the image displayed on the display unit to a first scrolling mode; when the proximity sensor senses that the distance between the object and the portable electronic device is out of the predetermined range, the signal processing unit switches the image displayed on the display unit to a second scrolling mode; and the second scrolling mode represents that the image displayed on the display unit is scrolled by a manual operation.

* * * * *